(12) United States Patent
Kim et al.

(10) Patent No.: US 9,857,649 B2
(45) Date of Patent: Jan. 2, 2018

(54) DISPLAY PANEL AND DISPLAY DEVICE COMPRISING THE SAME

(71) Applicant: Samsung Display Co., Ltd., Yongin, Gyeonggi-Do (KR)

(72) Inventors: Duk Sung Kim, Asan-si (KR); Sung Hwan Bae, Asan-si (KR); Young Min Jung, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 140 days.

(21) Appl. No.: 14/734,797

(22) Filed: Jun. 9, 2015

(65) Prior Publication Data

US 2016/0077397 A1 Mar. 17, 2016

(30) Foreign Application Priority Data

Sep. 11, 2014 (KR) ........................ 10-2014-0120055

(51) Int. Cl.
*G02F 1/1343* (2006.01)
*G02F 1/1362* (2006.01)

(52) U.S. Cl.
CPC .................... *G02F 1/13624* (2013.01); *G02F 2001/134345* (2013.01); *G02F 2001/136218* (2013.01)

(58) Field of Classification Search
None
See application file for complete search history.

(56) References Cited

U.S. PATENT DOCUMENTS

| 2005/0036091 A1* | 2/2005 | Song ................ G02F 1/133707 349/129 |
| 2009/0295693 A1 | 12/2009 | Yeom et al. |
| 2010/0123842 A1 | 5/2010 | Lee et al. |
| 2010/0309234 A1 | 12/2010 | Lee et al. |
| 2013/0077002 A1 | 3/2013 | Yoon et al. |
| 2013/0093658 A1* | 4/2013 | Park ..................... G02F 1/13452 345/92 |
| 2016/0210924 A1* | 7/2016 | Yao ...................... G09G 3/3648 |

FOREIGN PATENT DOCUMENTS

| KR | 10-2003-0005748 | 1/2003 |
| KR | 10-2009-0123738 | 12/2009 |
| KR | 10-2010-0055154 | 5/2010 |
| KR | 10-2013-0033802 | 4/2013 |

* cited by examiner

*Primary Examiner* — Richard Kim
(74) *Attorney, Agent, or Firm* — H.C. Park & Associates, PLC

(57) ABSTRACT

A display panel includes: a pixel electrode including first, second, and third sub-pixel electrodes separated from each other; a first TFT connected to the first sub-pixel electrode; second and fourth TFTs connected to the second sub-pixel electrode; a third TFT connected to the third sub-pixel electrode; a first gate line connected to the first to third TFTs; a second gate line connected to the fourth TFT; a data line electrically insulated from and intersecting the first and second gate lines and connected to the first to third TFTs; and a storage electrode connected to the fourth TFT and overlapping the first sub-pixel electrode.

11 Claims, 7 Drawing Sheets

DISPLAY PANEL AND DISPLAY DEVICE COMPRISING THE SAME

CLAIM OF PRIORITY

This application makes reference to, incorporates the same herein, and claims all benefits accruing under 35 U.S.C. §119 from an application earlier filed in the Korean Intellectual Property Office on 11 Sep. 2014 and there duly assigned Serial No. 10-2014-0120055.

BACKGROUND OF THE INVENTION

Field of the Invention

Aspects of embodiments of the present invention relate to a display panel designed to secure a wide viewing angle and improve light transmittance and to a display device including the display panel.

Description of the Related Art

A liquid crystal display (LCD) device is a type of flat panel displays (FPDs), which is most widely used these days. The LCD includes two substrates including electrodes formed thereon and a liquid crystal layer interposed therebetween. Upon applying voltage to two electrodes, liquid crystal molecules of the liquid crystal layer are rearranged, thereby adjusting the amount of transmitted light.

Such an LCD may be categorized into a twisted nematic mode, a vertically aligned mode, a fringe field switch mode and an in-plane switching mode according to an arrangement of liquid crystal molecules or electrodes when an electric field is not formed.

In the case of the vertically aligned mode of the LCD, a method has been studied where one pixel is divided into a plurality of sub-pixels and voltage of different levels are respectively applied to the sub-pixels to impart different transmittances thereto, so as to achieve side visibility similar to front visibility.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Embodiments of the present invention are directed to a display panel designed to secure a wide viewing angle and to improve light transmittance, and are directed to a display device including the display panel.

According to an embodiment of the present invention, a display panel includes: a pixel electrode including first, second, and third sub-pixel electrodes separated from each other; a first TFT connected to the first sub-pixel electrode; second and fourth TFTs connected to the second sub-pixel electrode; a third TFT connected to the third sub-pixel electrode; a first gate line connected to the first to third TFTs; a second gate line connected to the fourth TFT; a data line electrically insulated from and intersecting the first and second gate lines and connected to the first to third TFTs; and a storage electrode connected to the fourth TFT and overlapping the first sub-pixel electrode.

The first to third sub-pixel electrodes may be sequentially disposed between the first and second gate lines.

Voltages of different voltage levels may be respectively supplied to the first to third sub-pixel electrodes.

The voltage applied to the first sub-pixel electrode may be higher than the voltage applied to the second and third sub-pixel electrodes and the voltage applied to the third sub-pixel electrode may be higher than the voltage applied to the second sub-pixel electrode.

One of the first to third sub-pixel electrodes may include a plurality of slits.

The first to third TFTs may include a gate electrode connected to the first gate line, a source electrode connected to the data line, and a drain electrode respectively connected to the first to third sub-pixel electrodes. The gate electrodes of the first to third TFTs are connected to each other and the source electrodes thereof are connected to each other.

The drain electrode of the second TFT may overlap the third sub-pixel electrode.

The fourth TFT may include a gate electrode connected to the second gate line, a source electrode connected to the second sub-pixel electrode, and a drain electrode connected to the storage electrode.

The display panel may further include a shielding electrode overlapping the data line and the storage electrode.

A display device includes: a first substrate; gate and data lines intersecting each other on the first substrate; a pixel respectively connected to the gate and data lines; a second substrate disposed to face the first substrate and including a common electrode; and a liquid crystal layer interposed between the first and second substrates. The pixel may include: a pixel electrode including first, second, and third sub-pixel electrodes separated from each other; a TFT including a first TFT connected to the first sub-pixel electrode, second and fourth TFTs connected to the second sub-pixel electrode, and a third TFT connected to the third sub-pixel electrode; and a storage electrode overlapping the first sub-pixel electrode.

The gate line may include first gate line and a second gate line spaced apart from the first gate line, the first to third TFTs are connected to the first gate line, and the fourth TFT is connected to the second gate line.

The first to third sub-pixel electrodes may be sequentially disposed between the first and second gate lines.

The first to third TFTs may include a gate electrode connected to the first gate line, a source electrode connected to the data line, and a drain electrode respectively connected to the first to third sub-pixel electrodes. The gate electrodes of the first to third TFTs are connected to each other and the source electrodes thereof are connected to each other.

The drain electrode of the second TFT may overlap the third sub-pixel electrode.

The fourth TFT may include a gate electrode connected to the second gate line, a source electrode connected to the second sub-pixel electrode, and a drain electrode connected to the storage electrode.

Voltages of different voltage levels may be respectively applied to the first to third sub-pixel electrodes.

The voltage applied to the first sub-pixel electrode may be higher than the voltage applied to the second and third sub-pixel electrodes and the voltage applied to the third sub-pixel electrode is higher than the voltage applied to the second sub-pixel electrode.

One of the first to third sub-pixel electrodes may include a plurality of slits.

The pixel may further include a shielding electrode overlapping the data line and the storage electrode.

According to aspects of embodiments of the present invention, a display device may secure a wide viewing angle and improve light transmittance.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 1:
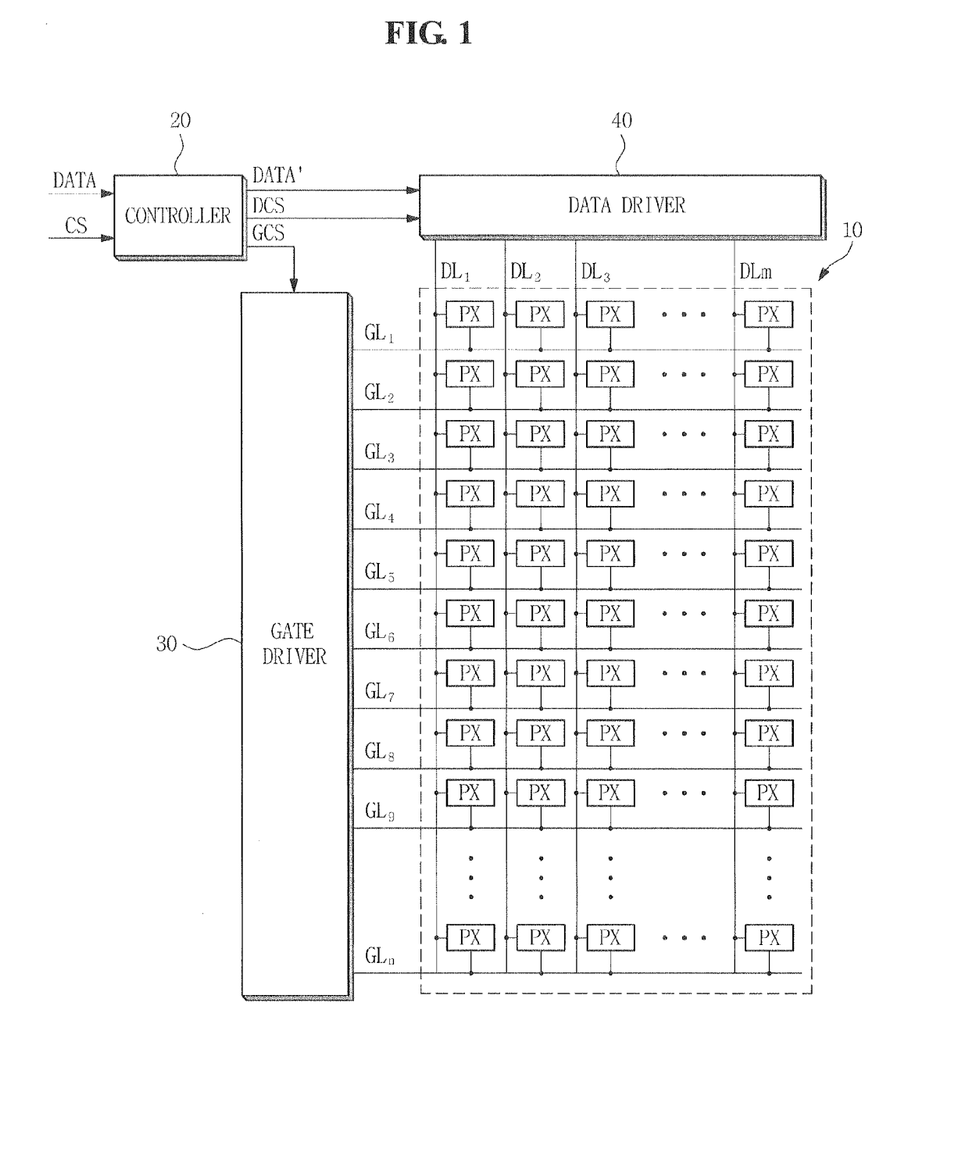
FIG. 1 is a block diagram illustrating a display device according to one embodiment of the present invention.
Figure 2:
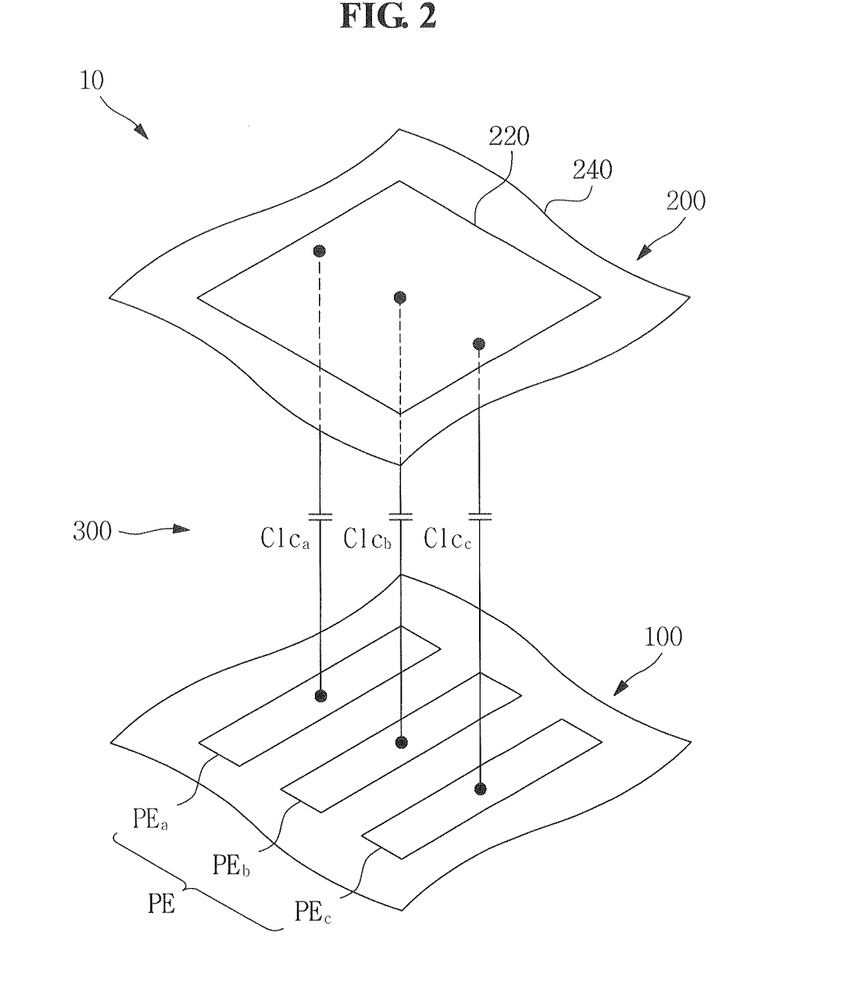
FIG. 2 is a configuration diagram illustrating the display device of FIG. 1 and an equivalent circuit diagram illustrating three sub pixels.

FIG. 1 is a block diagram illustrating a display device according to one embodiment of the present invention and FIG. 2 is a configuration diagram illustrating the display device of FIG. 1 and an equivalent circuit diagram illustrating three sub pixels.

Referring to FIGS. 1 and 2, the display device according to one embodiment of the present invention may include a display panel 10 including a plurality of pixels PXs, a controller 20 configured to process an image signal DATA and a control signal CS supplied from the outside to output a variety of signals, a gate driver 30 configured to supply gate signals to gate lines GL1~GLn connected to the pixels PXs, and a data driver 40 configured to supply data signals to data lines DL1~DLm connected to the pixels PXs.

The display panel 10 may include the plurality of gate lines GL1~GLn configured to supply the gate signals in a row direction, the plurality of data lines DL1~DLm configured to supply the data signals in a column direction, and the plurality of pixels PXs arranged in a matrix form connected to the gate and the data lines.

As shown in FIG. 2, the display panel 10 may include separately formed first substrate 100 and second substrate 200, which may be disposed to face the first substrate 100, and a liquid crystal layer 300 interposed between the first and second substrates 100 and 200.

A pixel electrode PE including a plurality of sub-pixel electrodes $PE_a$, $PE_b$, and $PE_c$, may be disposed on the first substrate 100. A color filter 220 and a common electrode 240 may be disposed on the second substrate 200. The sub-pixel electrodes $PE_a$, $PE_b$, and $PE_c$, the common electrode 240, and the liquid crystal layer 300 may form liquid crystal capacitors $Clc_a$, $Clc_b$, and $Clc_c$. However, embodiments of the present invention are not limited thereto, and thus the color filter 220 may be formed on the pixel electrode PE of the first substrate.

Turning back to FIG. 1, the controller 20 is configured to output corrected image signals DATA' to the data driver 40 based on the image signals DATA supplied from the outside. Further, the controller 20 may apply, based on the control signals CS supplied from the outside, a gate control signals GCS to the gate driver 30 and a data control signals DCS to the data driver 40. For example, the control signals CS may include timing signals such as vertical synchronization signals Vsync, horizontal synchoronization signals Hsync, clock signals CLK, and data enable signals DE. Further, the image signals DATA may also include digital signals expressing a gray level of light emitted from the pixel PX.

The gate driver 30 is configured to receive the gate control signals GCS from the controller 20 and to generate the gate signals and supply the gate signals to the pixels PXs respectively connected to the plurality of gate lines GL1~GLn. As the gate signals are sequentially inputted to the pixels PXs, the data signals may be sequentially applied to the pixels PXs.

The data driver 40 is configured to receive the data control signals DCS and the corrected image signals DATA' from the controller 20 and supply, in response to the data control signals DCS, data signals corresponding to the corrected image signals DATA' to the pixels PXs respectively connected to the plurality of data lines DL1~DLm. The data signals may be expressed as data voltages.

Figure 3:
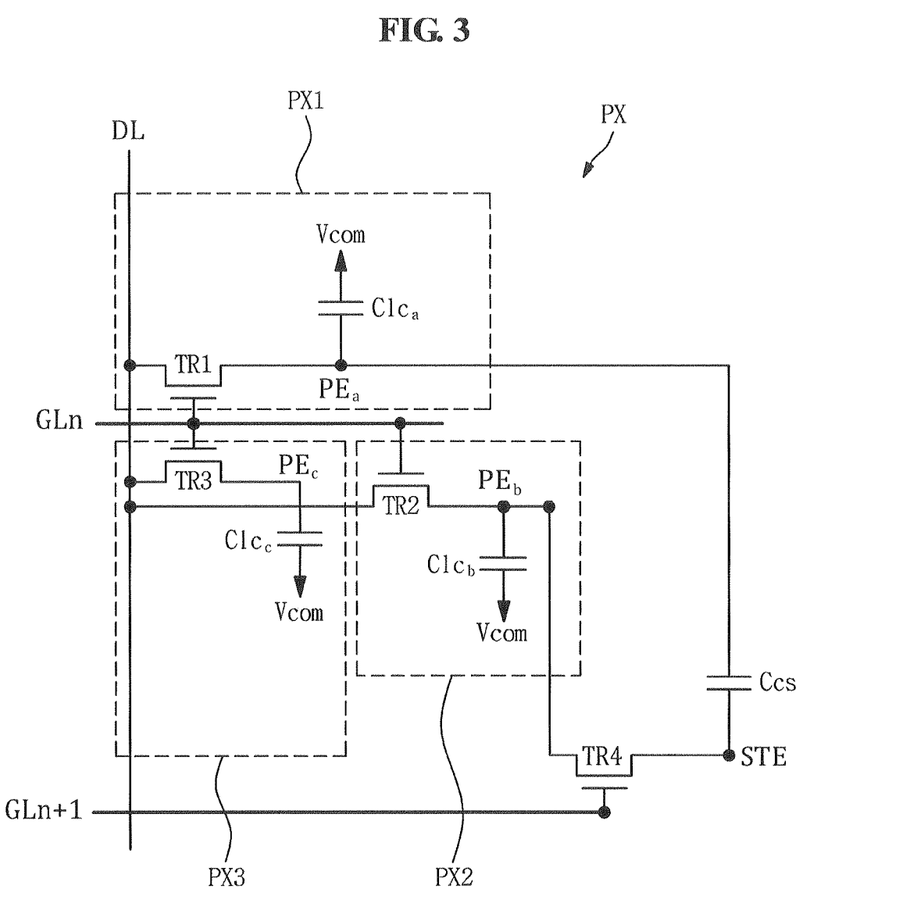
FIG. 3 is an equivalent circuit diagram illustrating one pixel of a display panel according to one embodiment of the present invention.

FIG. 3 is an equivalent circuit diagram illustrating one pixel of a display panel according to one embodiment of the present invention.

Referring to FIG. 3, one pixel PX may include first, second, and third sub-pixels PX1, PX2, and PX3. The first, second, and third sub-pixels PX1, PX2, and PX3 may respectively include first, second, and third thin film transistors (TFTs) TR1, TR2, and TR3 connected to the same gate and data lines GLn and DL.

Each control terminal of the first, second, and third TFTs TR1, TR2, and TR3 may be connected to the first gate line GLn. Further, each input terminal of the first, second, and third TFTs TR1, TR2, and TR3 may be connected to the same data line DL.

In the first TFT TR1, an output terminal may be connected to a first sub-pixel electrode $PE_a$ of the first sub-pixel PX1 and the first sub-pixel electrode may form the first liquid crystal capacitor $Clc_a$ along with the common electrode disposed on the second substrate and the liquid crystal layer.

In the second TFT TR2, an output terminal may be connected to a second sub-pixel electrode $PE_b$ of the second sub-pixel PX2 and the second sub-pixel electrode may form the second liquid crystal capacitor $Clc_b$ along with the common electrode disposed on the second substrate and the liquid crystal layer.

In the third TFT TR3, an output terminal may be connected to a third sub-pixel electrode $PE_c$ of the third sub-pixel PX3 and the third sub-pixel electrode may form the third liquid crystal capacitor $Clc_c$ along with the common electrode disposed on the second substrate and the liquid crystal layer.

A fourth TFT TR4 may also be provided. In the fourth TFT TR4, a control terminal may be connected to the second gate line GLn+1, an input terminal may be connected to the second sub-pixel electrode, and the output terminal may be connected to the first sub-pixel electrode.

When the gate signal is applied to the first gate line GLn, the data voltage is applied from the data line DL to the first to third sub-pixel electrodes via the first to third TFTs TR1, TR2, and TR3.

When the gate signal is applied to the second gate line GLn+1, a fraction of the data voltage transmitted through the output terminal of the second TFT TR2 may be transmitted to a storage electrode STE overlapping the first sub-pixel electrode through the fourth TFT TR4, which results in a voltage drop of the second sub-pixel electrode. Further, the storage electrode STE may form a charge share capacitor Ccs with the first sub-pixel electrode, which results in an increase in voltage of the first sub-pixel electrode.

Accordingly, voltage of different levels may be respectively applied to the first to third sub-pixel electrodes and each of the first to third sub-pixel electrodes may have luminance different from each other.

Figure 4:
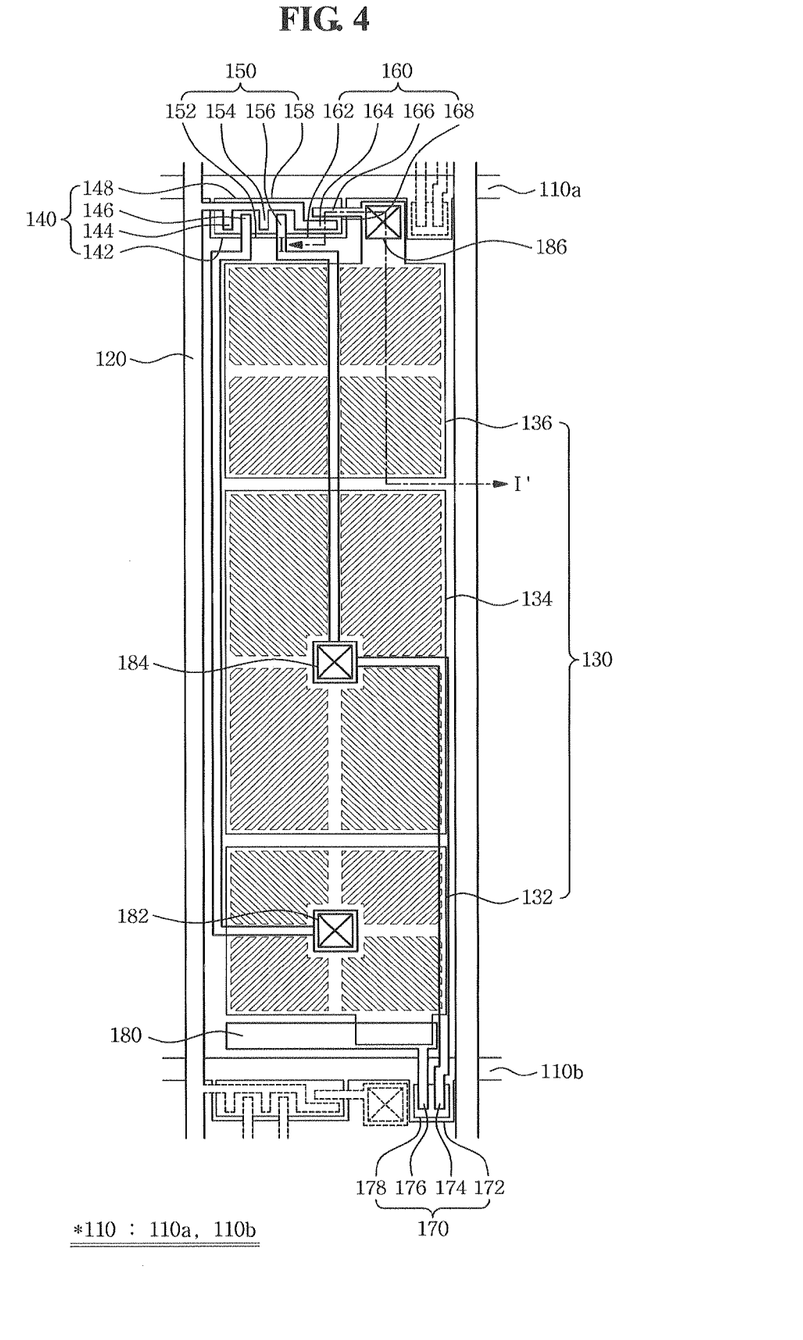
FIG. 4 is a plan view illustrating the display panel of FIG. 3.
Figure 5:
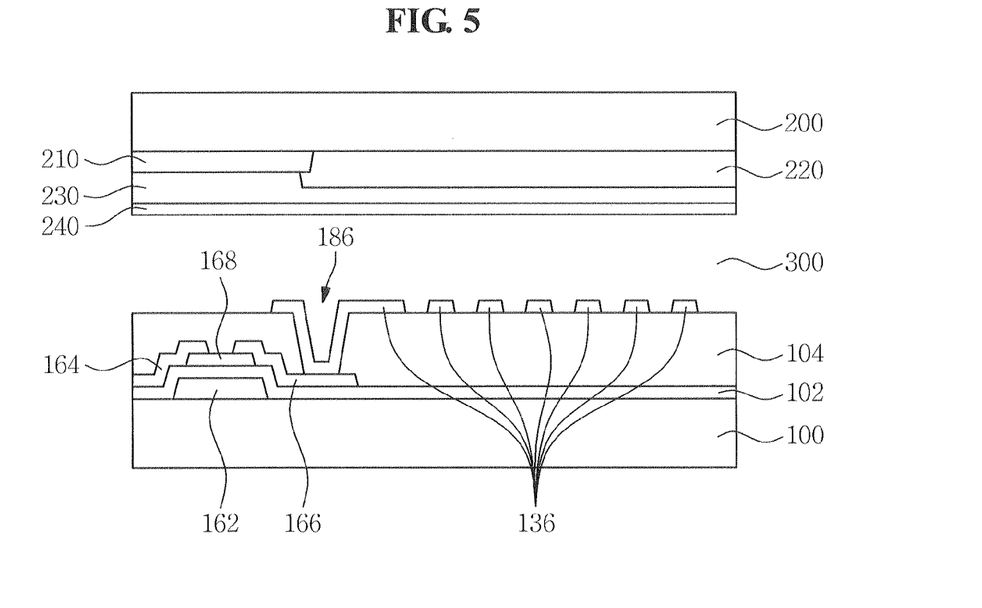
FIG. 5 is a cross-sectional view taken along a line I-I' of FIG. 4.

FIG. 4 is a plan view illustrating the display panel according to one embodiment of the present invention and FIG. 5 is a cross-sectional view taken along a line I-I' of FIG. 4.

Referring to FIGS. 4 and 5, the display device according to one embodiment of the present invention may include the first substrate 100, the second substrate 200 disposed to face the first substrate 100, and the liquid crystal layer 300 interposed between the first and second substrates 100 and 200.

The first substrate 100 may be formed of transparent glass or plastic and provided in a flat-panel type, a curved type having a predetermined radius of curvature, or a flexible type.

The first and second gate lines 110a and 110b may be disposed on the first substrate 100 formed of transparent glass or plastic and spaced apart from each other.

The gate lines 110 may be made of metal including at least one of aluminum (Al), silver (Ag), copper (Cu), molybdenum (Mo), an alloy thereof, chromium (Cr), tantalum (Ta) and titanium (Ti), but is not limited thereto. In some embodiments, the gate lines 110 may have a multi-layer structure including at least two conductive layers that have different physical properties.

The gate insulating layer 102 may be disposed on the gate lines 110 and made of silicon oxides (SiOx) or silicon nitrides (SiNx).

The data lines 120 may be disposed on the gate insulating layer 102 and intersect the first and second gate lines 110a and 110b. The data lines 120 may be made of refractory metal, such as molybdenum, chromium, tantalum and titanium or a metal alloy thereof, but is not limited thereto. In some embodiments, the data lines 120 may have a multi-layer structure including a refractory metal layer and a low-resistance conductive layer.

The pixel electrodes 130 may each include first, second, and third sub-pixel electrode 132, 134, and 136.

The first to third sub-pixel electrodes 132, 134, and 136 may be separated from each other and sequentially disposed between the first and second gate lines 110a and 110b. The first to third sub-pixel electrodes 132, 134, and 136 may have a quadrilateral shape. In some embodiments, the first to third sub-pixel electrodes may, however, be formed into many different forms and the present invention should not be construed as being limited to the forms described above.

The first to third sub-pixel electrodes 132, 134, and 136 may include a plurality of slits. However, the slits may, however, be formed into many different forms and the present invention should not be construed as being limited to the forms described above.

The first to third sub-pixel electrodes 132, 134, and 136 may be respectively applied voltages of different levels. It may be desirable that the voltage applied to the first sub-pixel electrode 132 is higher than the voltage applied to the second and third sub-pixel electrodes 134 and 136 and that the voltage applied to the third sub-pixel electrode 136 is higher than the voltage applied to the second sub-pixel electrode 134.

A first TFT 140 may include a first gate electrode 142 connected to the first gate line 110a, a first source electrode 144 connected to the data line 120, and a first drain electrode 146 connected to the first sub-pixel electrode 132 through a first contact hole 182. The first drain electrode 146 may extend along the data line 120 and be connected to the first sub-pixel electrode 132 and overlap the second and third sub-pixel electrodes 134 and 136. A first semiconductor layer 148 may be disposed on the first gate electrode 142 and separated from a gate insulating layer 102, but is not limited thereto. In some embodiments, the first semiconductor layer 148 may be integrally formed with the first gate electrode 142. The first source and drain electrodes 144 and 146 may be disposed to face each other on the gate insulating layer 102 or the first semiconductor layer 148.

A second TFT 150 may include a second gate electrode 152 connected to the first gate line 110a, a second source electrode 154 connected to the data line 120, and a second drain electrode 156 connected to the second sub-pixel electrode 134 through a second contact hole 184. The second drain electrode 156 may overlap the third sub-pixel electrode 136. A second semiconductor layer 158 may be disposed on the second gate electrode 152 and separated from a gate insulating layer 102, but is not limited thereto. In some embodiments, the second semiconductor layer 158 may be integrally formed with the second gate electrode 152. The second source and drain electrodes 154 and 156 may be disposed to face each other on the gate insulating layer 102 or the second semiconductor layer 158.

A third TFT 160 may include a third gate electrode 162 connected to the first gate line 110a, a third source electrode 164 connected to the data line 120, and a third drain electrode 166 connected to the third sub-pixel electrode 136 through a third contact hole 186.

A disposition of the third TFT 160 and the third sub-pixel electrode 136 will be described in detail with reference to FIG. 5.

The third gate electrode 162 may be disposed on the first substrate 100. A third semiconductor layer 168 may be disposed on the third gate electrode 162 and separated from a gate insulating layer 102, but is not limited thereto. In some embodiments, the third semiconductor layer 168 may be integrally formed with the third gate electrode 162.

The third source and drain electrodes 164 and 166 may be disposed to face each other on the gate insulating layer 102 or the third semiconductor layer 168. In one embodiment, the first, second and third semiconductor layers are integrally formed as a single semiconductor layer.

A protective layer 104 may be disposed on the third source and drain electrodes 164 and 166. The protective layer 104 may be formed of inorganic insulating materials or organic insulating materials. A surface of the protective layer 104 may be flatly formed.

The third sub-pixel electrode 136 may be disposed on the protective layer 104. An alignment layer (not illustrated) may be further disposed on the third sub-pixel electrode 136. The alignment layer may be a vertical alignment layer or an alignment layer optically aligned using a photopolymer material. The photopolymer material may be a reactive monomer or a reactive mesogen.

The first and second TFTs 140 and 150 and the first and second sub-pixel electrodes 132 and 134 may be disposed in the same manner as the third TFT 160 and the third sub-pixel electrode 136, and thus detailed description will be omitted.

The first to third gate electrodes 142, 152, and 162 may be connected to the first gate line 110a and integrally formed with each other, but are not limited thereto. In some embodiments, the first to third gate electrodes may be separately formed. The first to third source electrodes 154, 164, and 174 may be connected to a data line 120 and be bent into a U-shape to be connected to each other.

A fourth TFT 170 may include a fourth gate electrode 172 connected to the second gate line 110b, a fourth source electrode 174 connected to the second sub-pixel electrode 134, and a fourth drain electrode 176 connected to a storage electrode 180. A fourth semiconductor layer 178 may be disposed on the fourth gate electrode 172 and be separated therefrom a gate insulating layer 102, but is not limited thereto. In some embodiments, the fourth semiconductor layer 178 may be integrally formed with the fourth gate electrode 172. The fourth source and drain electrodes 174 and 176 may be disposed to face each other on the gate insulating layer 102 or the fourth semiconductor layer 178.

The storage electrode 180 may be disposed between the first sub-pixel electrode 132 and the second gate line 110b and overlap the first sub-pixel electrode 132 to form a charge share capacitor Ccs.

The second substrate 200 may be made of transparent glass or plastic and be provided in the same shape as the first substrate 100.

A black matrix 210 may prevent light leakage and be disposed on the second substrate 200 along the gate and data lines 110 and 120.

A color filter 220 may be disposed in an area surrounded by the black matrix 210. The color filter 220 may display one of base colors such as three primary colors of red, green, and blue, but is not limited thereto. In some embodiments, the color filter 220 may display one of cyan, magenta, yellow, and white colors.

According to one embodiment of the present invention, the black matrix 210 and the color filter 220 may be disposed on the second substrate 200, but are not limited thereto. In some embodiments, the black matrix 210 and the color filter 220 may be disposed on the first substrate 100.

A cover layer 230 may be disposed on the black matrix 210 and the color filter 220 and a common electrode 240 may be disposed on the cover layer 230.

Figure 6:
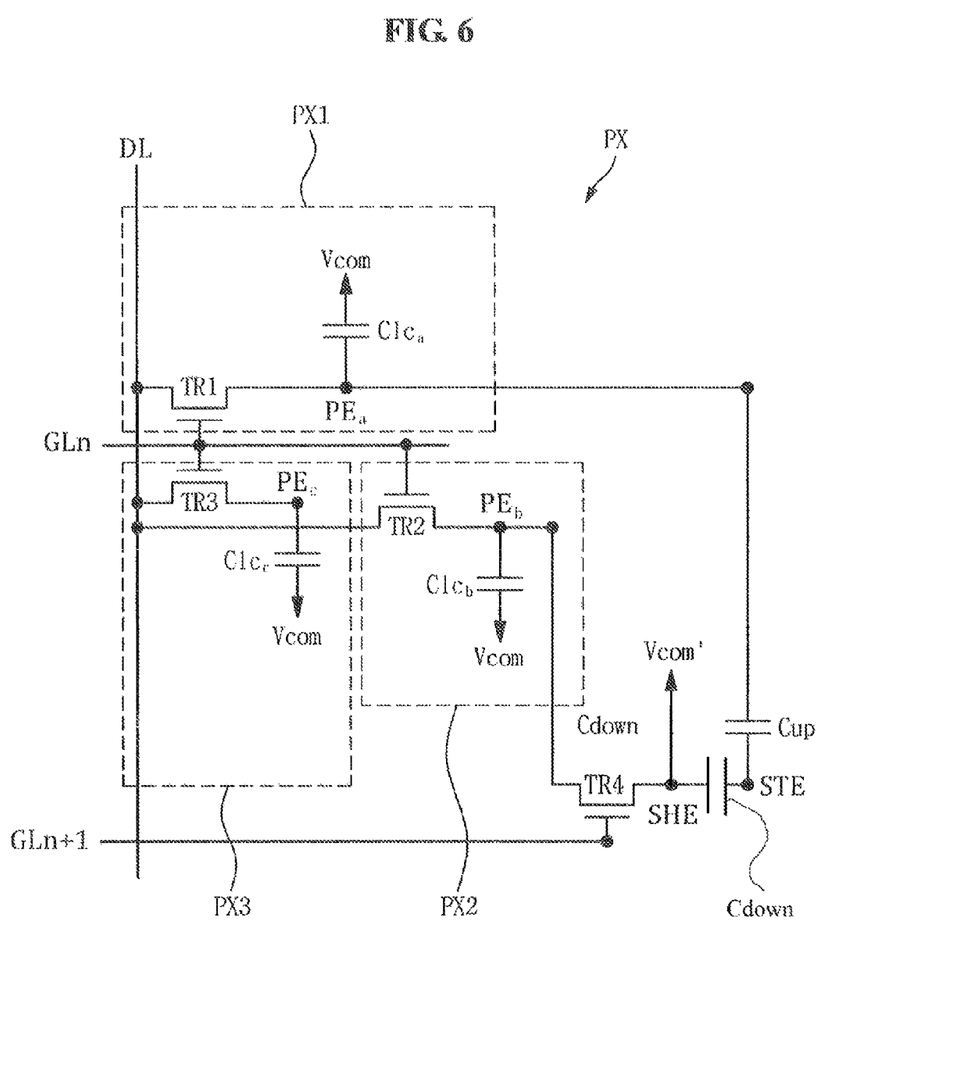
FIG. 6 is an equivalent circuit diagram illustrating one pixel of a display panel according to another embodiment of the present invention.
Figure 7:
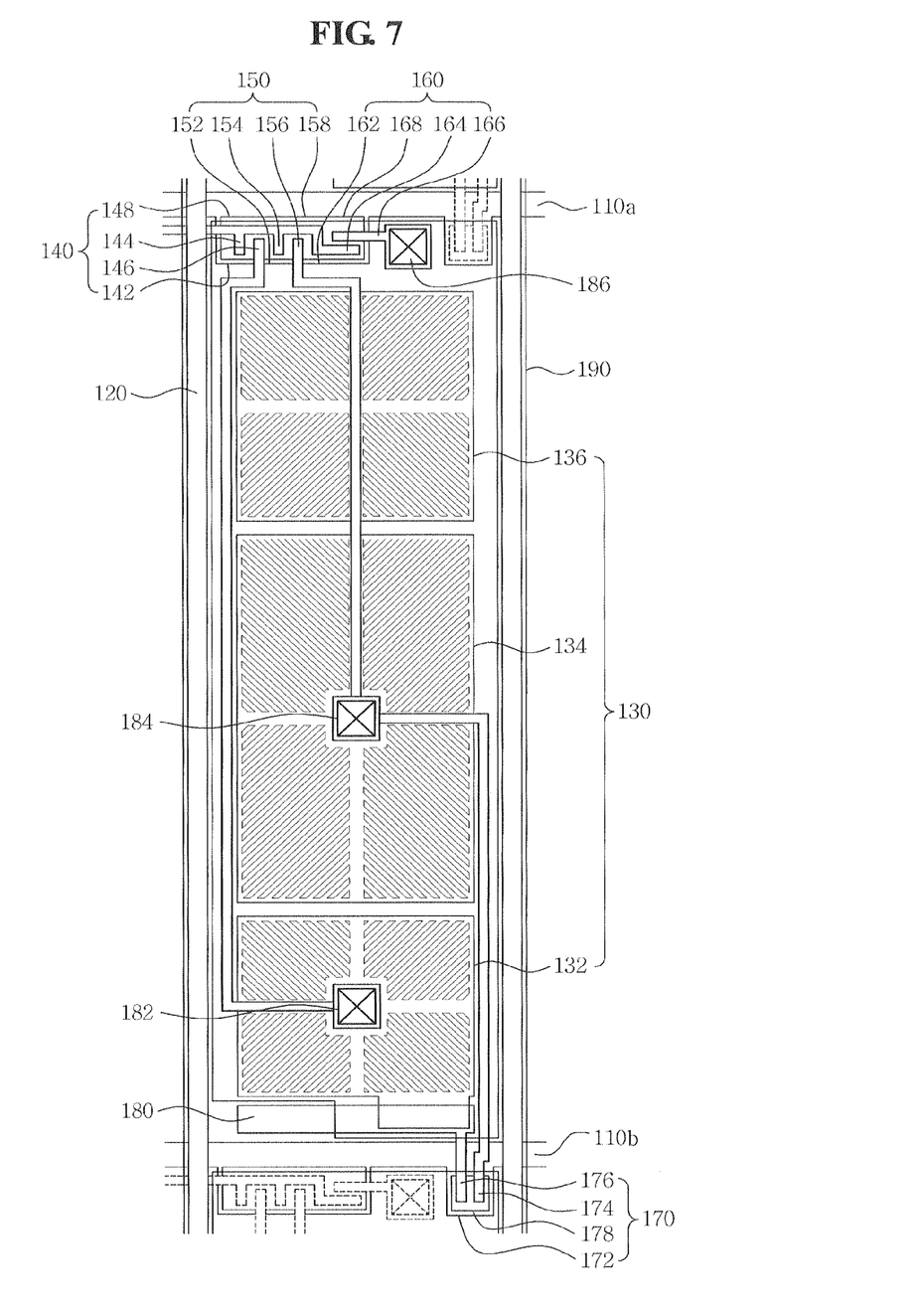
FIG. 7 is a plan view illustrating the display panel of FIG. 6.

FIG. 6 is an equivalent circuit diagram illustrating one pixel of a display panel according to another embodiment of the present invention and FIG. 7 is a plan view illustrating the display panel of FIG. 6.

Referring to FIGS. 6 and 7, the display panel according to another embodiment of the present invention may be identical to the display panel of FIGS. 3 and 4, except for a shielding electrode SHE 190. Thus, repeated descriptions will be omitted for brevity.

The shielding electrode 190 may be made of optically transparent and electrically conductive materials. Voltage Vcom', which is equivalent to voltage Vcom applied to the common electrode of the second substrate, may be applied to the shielding electrode 190.

The shielding electrode 190 may be disposed to overlap the data line 120 and the storage electrode 180. In more detail, the shielding electrode 190 may extend along an extending direction of the data line 120 to overlap the data line 120 and may extend along an extending direction of the gate line 110 at an intersecting area of the gate and data lines 110 and 120 to overlap the storage electrode 180.

The shielding electrode 190 may overlap the storage electrode 180 to form a down-charge share capacitor Cdown so that voltage of the second sub-pixel electrode 134 may decrease. Further, the storage electrode 180 may overlap the first sub-pixel electrode 132 to form an up-charge share capacitor Cup so that the voltage of the first sub-pixel electrode 132 may increase. Accordingly, voltage of different levels may be respectively applied to the first to third sub-pixel electrodes 132, 134, and 136.

Further, voltage equivalent to voltage applied to the common electrode of the second substrate is applied to the shielding electrode 190 so as to reduce or prevent light leakage in an area overlapping the data line 120. Therefore, a width of the black matrix disposed on the second substrate along the data line 120 may be reduced.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display panel, comprising:
    a pixel electrode comprising first, second, and third sub-pixel electrodes disposed spaced apart from each other;
    a first thin film transistor (TFT) connected to the first sub-pixel electrode through a first contact hole;
    second and fourth TFTs connected to the second sub-pixel electrode through a second contact hole;
    a third TFT connected to the third sub-pixel electrode;
    a first gate line connected to the first through third TFTs;
    a second gate line connected to the fourth TFT;
    a data line electrically insulated from and intersecting the first and second gate lines and connected to the first through third TFTs; and
    a storage electrode connected to the fourth TFT and overlapping the first sub-pixel electrode, wherein at least one of the first and the second contact holes is positioned substantially at a central portion of a corresponding one of the first and the second sub-pixel electrodes respectively.

2. The display panel of claim 1, wherein the third, second and first sub-pixel electrodes are sequentially arranged in going from the first gate line to the second gate line, the third sub-pixel electrode being spaced apart from the first sub-pixel electrode by the second sub-pixel electrode.

3. The display panel of claim 1, wherein voltages of different voltage levels are respectively supplied to the first through third sub-pixel electrodes.

4. The display panel of claim 3, wherein the voltage applied to the first sub-pixel electrode is higher than the voltages applied to the second and third sub-pixel electrodes, and the voltage applied to the third sub-pixel electrode is higher than the voltage applied to the second sub-pixel electrode.

5. The display panel of claim 1, wherein one of the first through third sub-pixel electrodes comprises a plurality of slits.

6. The display panel of claim 1, wherein each of the first through third TFTs comprise a gate electrode connected to the first gate line, a source electrode connected to the data line, and a drain electrode respectively connected to the first through third sub-pixel electrodes, and
    wherein the gate electrodes of the first through third TFTs are connected to each other and the source electrodes thereof are connected to each other.

7. The display panel of claim 6, wherein the drain electrode of the second TFT overlaps the third sub-pixel electrode.

8. The display panel of claim 1, wherein the fourth TFT comprises a gate electrode connected to the second gate line, a source electrode connected to the second sub-pixel electrode, and a drain electrode connected to the storage electrode.

9. The display panel of claim 1, further comprising a shielding electrode overlapping the data line and the storage electrode.

10. The display panel of claim 1, wherein the second gate line is disposed between the pixel electrode and the fourth TFT, and
    wherein the first, second, third TFTs are disposed between the first gate line and the pixel electrode.

11. The display panel of claim 1, wherein the at least one of the first and second contact holes is positioned at a crossing point of a stem portion of the first and second pixel electrodes.

* * * * *